Nov. 10, 1936. D. SENSAUD DE LAVAUD 2,060,558
DISK DIFFERENTIAL GEAR
Filed Dec. 26, 1935  2 Sheets-Sheet 1

Nov. 10, 1936. D. SENSAUD DE LAVAUD 2,060,558
DISK DIFFERENTIAL GEAR
Filed Dec. 26, 1935 2 Sheets-Sheet 2
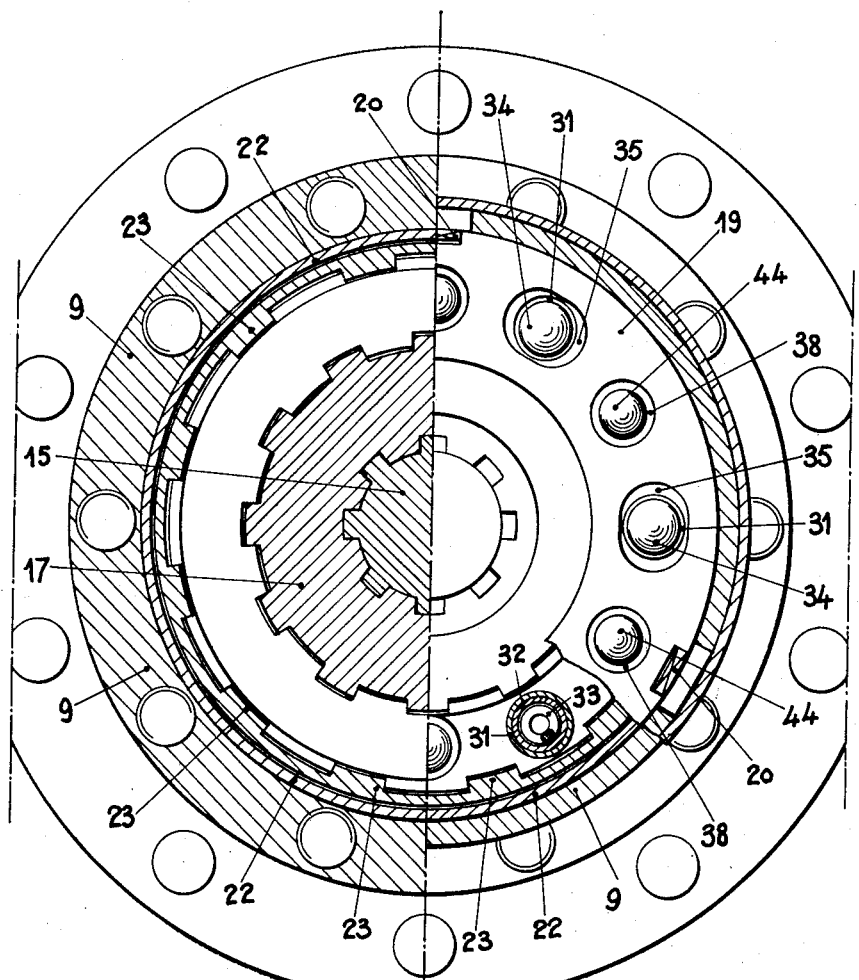
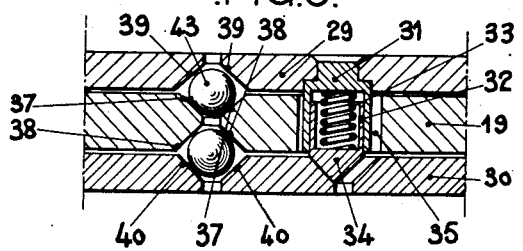

Patented Nov. 10, 1936

2,060,558

UNITED STATES PATENT OFFICE 2,060,558

DISK DIFFERENTIAL GEAR

Dimitri Sensaud de Lavaud, Paris, France

Application December 26, 1935, Serial No. 56,265
In France January 4, 1935

3 Claims. (Cl. 74—389.5)

The present invention relates to a disk differential gear, characterized by the fact that on each of the driven shafts are angularly and rigidly secured friction members alternating with other members angularly rigid with a loosely mounted socket, the entire set of said friction members resiliently held applied in position being arranged between a cheek member rigid with the driving shaft and a sliding ring rigid with said socket and having inclines on which bear balls or like members bearing, on the other hand, on inclines provided on an intermediate and axially fixed ring angularly rigid with the driving shaft, the entire differential gear being preferably symmetrical relatively to this ring.

In a form of construction, which for the moment appears to be advantageous, both pressure rings, arranged on either side of the intermediate driving ring, are normally spaced apart by a resilient device which creates a certain pressure between the friction members and tends to angularly and resiliently restore said side rings to identical positions relatively to the intermediate ring.

The present invention also relates to a number of particular points which will appear from the following description with reference to the accompanying drawings, given by way of example only, in which:

Fig. 2 is a partly sectional view made according to line II—II of Fig. 1, partly a side view, one of the rings provided with inclines being removed, and partly a sectional view made according to line III—III of Fig. 1.

Fig. 3 is a partial sectional view made according to line IV—IV of Fig. 1, the rings being assumed to be developed.

Figure 1:
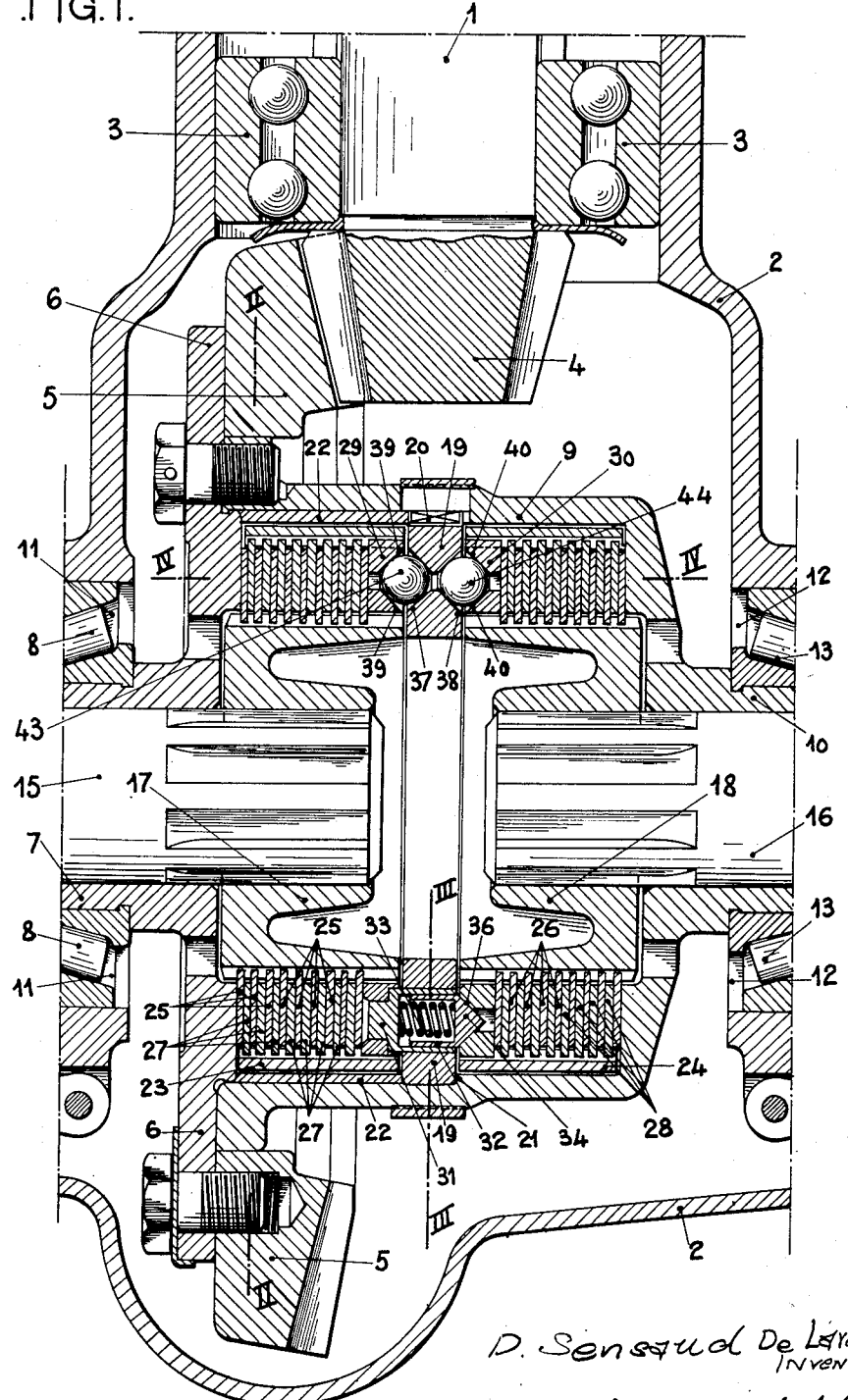
Fig. 1 is an axial sectional view of a differential gear made according to the invention.

In the various figures of the drawings, the same reference numbers designate like parts. On a driving shaft 1, journalled in a casing 2, through the medium of a ball bearing 3 for instance, is keyed a bevel pinion 4. This pinion 4 meshes with a crown wheel 5 having conical teeth and rendered rigid with a disk 6 by any suitable means. This disk 6 is provided with a side hub 7 journalled in a bore 11 of casing 2 through the medium of a roller bearing 8 constituting at the same time an abutment. The disk 6 is rendered rigid with a drum 9, the hub 10 of which is also journalled in a bore 12 of casing 2 through the medium of a roller bearing 13 constituting at the same time an abutment. In the hubs 7 and 10 are journalled co-axial shafts 15 and 16, respectively.

These shafts are fluted at their ends respectively. The periphery of the drums 17 and 18 is fluted. A ring 19 is rendered angularly rigid with drum 9 and within the latter, by any suitable means, such as keys 20. On the other hand, this ring 19 is axially held by an offset portion 21 of the bore of drum 9 and by a stay socket 22. Two sockets 23 and 24 are loosely mounted within the drum 9 and on either side of ring 19, these sockets 23 and 24 being respectively located opposite the fluted drums 17 and 18. These sockets are internally fluted. Between socket 23 and drum 17 are arranged friction disks 25 and 27 which alternate and are rendered angularly rigid with drum 17 and socket 23, respectively. Likewise, between socket 24 and drum 18, are arranged friction disks 26 and 28 which alternate and are angularly rigid with drum 18 and socket 23.

Between the end disk 25 and the ring 19 is interposed a ring 29 angularly rigid with socket 23 but axially movable; likewise, between the end disk 26 and ring 19, is interposed a ring 30 angularly rigid with socket 24, but axially movable. Both rings 29 and 30 are angularly connected together by a resilient returning device allowing them a certain angular displacement in antagonism to the action of said resilient returning device, which latter also serves to move, on the one hand, disks 25 and 27 and, on the other hand, disks 26 and 28 in frictional contact together. In a form of construction, which for the moment appears to be advantageous, this device is constituted by a number of sockets 31, rigid with the ring 29, and within each of which moves a small blind piston 32 the free end 34 of which is of conical shape, so that it can fit into a recess 36, also of conical shape, provided in ring 30. Between the small piston 32 and the socket 31 is arranged a spring 33 tending to move the rings 29 and 30 apart. Each of the sockets 31 extends through the intermediate ring 19 by passing through an oblong aperture 35 of the latter, which allows a certain angular displacement between the sockets 31 and the ring 19 and, consequently, between this ring 19 and the ring 29 carrying the sockets 31.

On each of the faces of ring 19 and on the opposite face of each of the rings 29 and 30 are respectively formed conical recesses or inclines 37 and 39, on the one hand, and 40 and 41, on the other hand. Between these inclines 37 and 39 and 40 and 41 are arranged balls 43 and 44, respectively. These conical recesses and these balls are distributed on the periphery of the rings, as more clearly shown in Fig. 2.

The operation is as follows:

The driving shaft 1 being caused to rotate, drives in its movement, through the medium of pinion 4 meshing with crown wheel 5, the drum 9 rigid with the latter. This drum 9 drives, in its turn, the intermediate ring 19. The shafts 15 and 16 being stationary as well as the drums 17 and 18, brake, through the respective friction disks, the loose sockets 23 and 24 which remain stationary. A relative angular displacement therefore takes place between rings 29 and 30 and intermediate ring 19. The balls 43 and 44 respectively move between inclines 37 and 39 and 40 and 41 and axially push back the rings 29 and 30 which then firmly press the friction disks against each other, thus causing the simultaneous and immediate actuation of the driven shafts 15 and 16, whatever may be the direction of rotation of driving shaft 1 owing to the symmetry of the inclines, the end rings 25 and 26 being respectively pressed against the inner side face of disk 6 and against the inner side face of drum 9.

If, for any reason whatever, such as a reduction of resistance, one of the driven shafts, and for instance shaft 15, tends to rotate at a higher speed than shaft 16, the ring 29, which is frictionally rigid therewith, will tend to rotate at a higher speed than ring 30 and, consequently, than the intermediate ring 19, the speed of which cannot exceed that of the ring rotating at the lowest speed. This ring 29 moves to the position diagrammatically illustrated in Fig. 3, in which the play or clearances have been exaggerated for facilitating the comprehension, and, consequently, releases the ball 43 from between the inclines 37 and 39, thus relieving the pressure between disks 25 and 27, and between ring 29 and disk 6, allowing only to subsist the residual pressure produced by the springs 33, which residual pressure is insufficient for actuating the driven shaft 15. As soon as the speed of the driven shaft 15 diminishes, and owing to the said residual friction and of the returning action exerted by pistons 34 which tend, under the action of springs 33, to enter the conical recesses 36 by moving, in the case under consideration, the socket 29 in the direction reverse to the rotation, the socket 23 and, consequently, the ring 29 are braked relatively to ring 19 and the ball 43 again pushes back this ring 29 owing to the displacement of said ball on the walls of the conical recesses 37 and 39.

A similar operation would take place for the shaft 16 if the latter should tend to rotate at a higher speed than shaft 15.

It is obvious that the invention is not limited to the form of construction described above and illustrated, but that it is applicable to all those utilizing the features above set forth and allowing to obtain the desired result.

What I claim as my invention and desire to secure by Letters Patent is:

1. Disk differential gear comprising a driving shaft, a toothed pinion rigidly secured on the end of said driving shaft, a toothed crown wheel meshing with said toothed pinion, a drum rigid with said toothed crown wheel, a first driven shaft, a second driven shaft co-axial with the first one, a first series of disks angularly rigid with said first driven shaft, a second series of disks angularly rigid with said second driven shaft, a third and a fourth series of disks respectively alternating with those of the first and second series, a first loose socket rendered angularly rigid with the third series of disks, a second loose socket rendered angularly rigid with the fourth series of disks, a first and a second side ring axially sliding and respectively rendered rigid with the first and second loose sockets, an intermediate ring rendered axially and angularly rigid with said drum, the three rings above mentioned having inclines on which bear rolling bodies so that a relative rotation between said intermediate ring and any of said side rings causes an axial displacement of this side ring, cheek members rigid with said drum and on which the outer end disks of the series of disks above mentioned can take a bearing whilst the inner end disks of said series of disks respectively bear on the side rings.

2. Disk differential gear comprising a driving shaft, a toothed pinion rigidly secured on the end of said driving shaft, a toothed crown wheel meshing with said toothed pinion, a drum rigid with said toothed crown wheel, a first driven shaft, a second driven shaft co-axial with the first one, a first series of disks angularly rigid with said first driven shaft, a second series of disks angularly rigid with said second driven shaft, a third and a fourth series of disks respectively alternating with those of the first and second series, a first loose socket rendered angularly rigid with the third series of disks, a second loose socket rendered angularly rigid with the fourth series of disks, a first and a second side ring axially sliding and respectively rendered rigid with the first and second loose sockets, an intermediate ring rendered axially and angularly rigid with said drum, the three rings above mentioned having inclines on which bear rolling bodies so that a relative rotation between said intermediate ring and any of said side rings causes an axial displacement of this side ring, a resilient device arranged between the first and second side rings and tending to space them apart and to angularly restore them to the position of rest when one of these side rings rotates relatively to the other, cheek members rigid with said drum and on which the outer end disks of the series of disks above mentioned can take a bearing whilst the inner end disks of said series of disks respectively bear on the side rings.

3. Disk differential gear comprising a driving shaft, a toothed pinion rigidly secured on the end of said driving shaft, a toothed crown wheel meshing with said toothed pinion, a drum rigid with said toothed crown wheel, a first driven shaft, a second driven shaft co-axial with the first one, a first series of disks angularly rigid with said first driven shaft, a second series of disks angularly rigid with said second driven shaft, a third and a fourth series of disks respectively alternating with those of the first and second series, a first loose socket rendered angularly rigid with the third series of disks, a second loose socket rendered angularly rigid with the fourth series of disks, a first and a second side ring axially sliding and respectively rendered rigid with the first and second loose sockets, an intermediate ring rendered axially and angularly rigid with said drum, the three rings above mentioned having inclines on which bear rolling bodies so that a relative rotation between said intermediate ring and any of said side rings causes an axial displacement of this side ring, a first blind socket secured to the first side ring, a second blind socket slidable in said first socket, a compression spring arranged within sockets for tending to push them relatively to each other, said second socket terminating in a conical part which enters a recess of corresponding shape provided in said second side ring, the unit constituted by said sockets passing with play through a suitable perforation formed in said intermediate ring, cheek members rigid with said drum and on which the outer end disks of the series of discs above mentioned can take a bearing whilst the inner end disks of said series of disks respectively bear on the side rings.

DIMITRI SENSAUD DE LAVAUD.